US012556993B2

(12) United States Patent
Kalia et al.

(10) Patent No.: US 12,556,993 B2
(45) Date of Patent: Feb. 17, 2026

(54) DISTRIBUTED UNIT ARCHITECTURE FOR PERFORMING HANDOVER BETWEEN DISTRIBUTED UNITS IN A VRAN

(71) Applicant: Microsoft Technology Licensing, LLC, Redmond, WA (US)

(72) Inventors: Anuj Kalia, San Francisco, CA (US); Junzhi Gong, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 372 days.

(21) Appl. No.: 18/450,962

(22) Filed: Aug. 16, 2023

(65) Prior Publication Data

US 2025/0063448 A1 Feb. 20, 2025

(51) Int. Cl.
*H04W 36/00* (2009.01)
*H04W 36/08* (2009.01)
*H04W 36/22* (2009.01)

(52) U.S. Cl.
CPC ......... *H04W 36/13* (2023.05); *H04W 36/087* (2023.05); *H04W 36/22* (2013.01)

(58) Field of Classification Search
CPC ... H04W 36/087; H04W 36/08; H04W 36/22; H04W 36/0033; H04W 88/085;
(Continued)

(56) References Cited

U.S. PATENT DOCUMENTS

2017/0063671 A1 3/2017 Gandhi
2021/0204185 A1* 7/2021 Fitch .................. H04W 36/304
(Continued)

FOREIGN PATENT DOCUMENTS

WO WO-2019056206 A1 * 3/2019 ............ H04W 76/15
WO WO-2019245447 A1 * 12/2019 ........ H04W 28/0231
WO 2023274730 A2 1/2023

OTHER PUBLICATIONS

"Altiostar and Rakuten Mobile Demonstrate Success Across Performance and Scalability for Open RAN Network", Retrieved from: https://www.prnewswire.com/news-releases/altiostar-and-rakuten-mobile-demonstrate-success-across-performance-and-scalability-for-open-ran-network-301254947.html, Mar. 24, 2021, 4 Pages.
(Continued)

*Primary Examiner* — Nizar N Sivji
(74) *Attorney, Agent, or Firm* — Ray Quinney & Nebeker P.C.; James S. Bullough

(57) ABSTRACT

The present disclosure relates to systems, methods, and computer-readable media for increasing resiliency in distributed units of a virtual radio access network (vRAN) of a telecommunications network (e.g., a 5G telecommunications network), particularly when performing a planned handover operation between the distributed units. The examples described herein specifically relate to implementing an inter-distributed unit handover between distributed units that are serviced by the same radio unit. In some examples, this handover is initiated by a middlebox entity that is positioned between the distributed units and a centralized unit. In some instances, features of the middlebox entity are implemented within the framework of a centralized unit. By allowing a quick handover as described herein, the distributed units can provide uninterrupted service to a UE while allowing the distributed units to perform various upgrades or modifications to the distributed unit without service interruptions.

20 Claims, 7 Drawing Sheets

(58) Field of Classification Search
CPC ..... H04W 88/08; H04W 88/14; H04W 36/13; H04W 36/00
See application file for complete search history.

(56) References Cited

U.S. PATENT DOCUMENTS

| | | | |
|---|---|---|---|
| 2021/0243613 | A1* | 8/2021 | Khanfouci .......... H04L 41/0895 |
| 2021/0274406 | A1 | 9/2021 | Ode |
| 2022/0159768 | A1 | 5/2022 | Zhu |
| 2022/0272594 | A1 | 8/2022 | Anderson |
| 2023/0247495 | A1* | 8/2023 | Teyeb .................. H04W 40/24 370/331 |
| 2024/0244459 | A1* | 7/2024 | Mukherjee .......... H04W 36/087 |
| 2024/0292241 | A1 | 8/2024 | Goyal |
| 2024/0381198 | A1* | 11/2024 | Goyal ............. H04W 36/00837 |
| 2024/0406765 | A1 | 12/2024 | Kalia |

OTHER PUBLICATIONS

"CapGemini Engineering", Retrieved from: https://www.capgemini.com/nl-nl/over-ons/wie-zijn-wij/onze-merken/capgemini-engineering/, Retrieved Date: Mar. 22, 2023, 9 Pages.
"Control, User and Synchronization Plane Specification", In O-RAN Working Group 4 (Open Fronthaul Interfaces WG), Mar. 2023, 376 Pages.
"Dash-Industry-Forum / dash.js", Retrieved from: https://github.com/Dash-Industry-Forum/dash.js/wiki/Low-Latency-streaming, Retrieved Date: Mar. 22, 2023, 17 Pages.
"Developer Zone", Retrieved from: https://www.intel.com/content/www/us/en/developer/overview.html#gs.x0fu6r, Retrieved Date: Mar. 22, 2023, 8 Pages.
"DPDK", Retrieved from: https://www.dpdk.org/, Retrieved Date: Mar. 22, 2023, 5 Pages.
"E2 Service Model (E2SM)", In O-RAN Fronthaul Working Group, Mar. 2023, 36 Pages.
"eBPF", Retrieved from: https://ebpf.io/, Retrieved Date: Mar. 23, 2023, 6 Pages.
"F1 Application Protocol (F1AP) (3GPP TS 38.473 version 15.8.0 Release 15)", Retrieved from: https://www.etsi.org/deliver/etsi_ts/138400_138499/138473/15.08.00_60/ts_138473v150800p.pdf, Jan. 2020, 224 Pages.
"Kubernetes", Retrieved from: https://kubernetes.io/, Retrieved Date: Mar. 22, 2023, 6 Pages.
"Mavenir & Dish", Retrieved from: https://www.mavenir.com/case-studies/mavenir-and-dish/, Retrieved Date: Mar. 22, 2023, 5 Pages.
"Near-RT RIC Architecture", In O-RAN Fronthaul Working Group, Mar. 2023, 115 Pages.
"Openairinterface5G", Retrieved from: https://gitlab.eurecom.fr/oai/openairinterface5g, Retrieved Date: Mar. 22, 2023, 3 Pages.
"O-RAN Specifications", Retrieved from: https://www.o-ran.org/specifications, Retrieved Date: Mar. 22, 2023, 2 Pages.
"O-RAN Software Community", Retrieved from: https://github.com/o-ran-sc, Retrieved Date: Mar. 22, 2023, 3 Pages.
"P416 Language Specification", Retrieved from: https://p4.org/p4-spec/docs/P4-16-v1.2.0.html, Oct. 23, 2019, 191 Pages.
"Procedures for the 5G System (3GPP TS 23.502 version 15.2.0 Release 15)", Retrieved from: https://www.etsi.org/deliver/etsi_ts/123500_123599/123502/15.02.00_60/ts_123502v150200p.pdf, Jun. 2018, 311 Pages.
"Protocol Buffers", Retrieved from: https://protobuf.dev/, Retrieved Date: Mar. 22, 2023, 1 Page.
"The Journey to a Cloud-native, Fully Software-defined vRAN Architecture", In White Paper of vRAN, Dec. 5, 2022, 10 Pages.
"UBPF", Retrieved from: https://github.com/iovisor/ubpf, Retrieved Date: Mar. 22, 2023, 5 Pages.
"User Equipment (UE) procedures in idle mode and in RRC Inactive state (3GPP TS 38.304 version 15.6.0 Release 15)", Retrieved from: https://www.etsi.org/deliver/etsi_ts/138300_138399/138304/15.06.00_60/ts_138304v150600p.pdf, Jan. 2020, 32 Pages.
Ahmed, et al., "Characterizing Failure and Repair Time of Servers in a Hyper-scale Data Center", In Proceedings of IEEE PES Innovative Smart Grid Technologies Europe, Oct. 26, 2020, pp. 660-664.
Birke, et al., "Failure Analysis of Virtual and Physical Machines: Patterns, Causes and Characteristics", In Proceedings of 44th Annual IEEE/IFIP International Conference on Dependable Systems and Networks, Jun. 23, 2014, pp. 1-12.
Boutibaa, et al., "NRflex: Enforcing Network Slicing in 5G New Radio", In Journal of Computer Communications, Jan. 1, 2022, 24 Pages.
Gabriel, Caroline, "Rakuten claims huge edge cloud, as other operators follow suit", Retrieved from: https://rethinkresearch.biz/articles/rakuten-claims-huge-edge-cloud-as-other-operators-follow-suit/, Nov. 22, 2019, 7 Pages.
Geba, Scott, "Introduction to Port Mirroring", Retrieved from: https://arista.my.site.com/AristaCommunity/s/article/introduction-to-port-mirroring, Oct. 28, 2013, 9 Pages.
Hong, et al., "Picasso: flexible RF and spectrum slicing", In ACM SIGCOMM Computer Communication Review, vol. 42, Issue 4, Aug. 13, 2012, 12 Pages.
Katsarakis, et al., "rVNF: Reliable, scalable and performant cellular VNFs in the cloud", In Technical Report MSR-TR-2021-7, Apr. 2021, pp. 1-15.
Kist, et al., "SDR Virtualization in Future Mobile Networks: Enabling Multi-Programmable Air-Interfaces", In Proceedings of IEEE International Conference on Communications, May 20, 2018., pp. 1-6.
Lazarev, et al., "Resilient Baseband Processing in Virtualized RANs with Slingshot", In Technical Report-MSR-TR-2023-11, Feb. 2023, 17 Pages.
Li, et al., "A Control-Plane Perspective on Reducing Data Access Latency in LTE Networks", In Proceedings of the 23rd Annual International Conference on Mobile Computing and Networking, Oct. 2017, pp. 56-69.
Li, et al., "Beyond 5G: Reliable Extreme Mobility Management", In Proceedings of the Annual conference of the ACM Special Interest Group on Data Communication on the applications, technologies, architectures, and protocols for computer communication, Aug. 10, 2020, pp. 344-358.
Lin, et al., "5G New Radio: Unveiling the Essentials of the Next Generation Wireless Access Technology", In Journal of IEEE Communications Standards Magazine, vol. 3, Issue: 3, Sep. 2019, pp. 30-37.
Lin, et al., "A Primer on Bandwidth Parts in 5G New Radio", In Journal of 5G and Beyond: Fundamentals and Standards, Mar. 26, 2021, pp. 1-7.
Mendes, et al., "Cellular Access Multi-Tenancy through Small Cell Virtualization and Common RF Front-End Sharing", In Proceedings of the 11th Workshop on Wireless Network Testbeds, Experimental evaluation & CHaracterization, Oct. 2017, pp. 35-42.
Nguyen, et al., "ECHO: A Reliable Distributed Cellular Core Network for Hyper-scale Public Clouds", In Proceedings of the 24th Annual International Conference on Mobile Computing and Networking, Oct. 29, 2018, pp. 163-178.
Nyberg, Sofia, "Physical Cell ID Allocation in Cellular Networks", In Master thesis of Linköping University, 2016, 75 Pages.
Qazi, et al., "A high performance packet core for next generation cellular networks", In Proceedings of the Conference of the ACM Special Interest Group on Data Communication, Aug. 21, 2017, pp. 348-362.
Qureshi, et al., "Coordinating rolling software upgrades for cellular networks", In Proceedings of IEEE 25th International Conference on Network Protocols (ICNP), Oct. 10, 2017, 10 Pages.
Ramanathan, et al., "Resiliency in Open-Source Solutions for Disaggregated 5G Cloud Radio Access and Transport Networks", In Proceedings of IEEE Conference on Network Function Virtualization and Software Defined Networks (NFV-SDN), Nov. 14, 2022, pp. 124-129.
Raza, et al., "LTE NFV Rollback Recovery", In Journal of IEEE Transactions on Network and Service Management ( vol. 19, Issue: 3, Sep. 2022, pp. 2468-2477.

(56) References Cited

OTHER PUBLICATIONS

Schulz, Karen, "Verizon deploys more than 8,000 VRAN cell sites, rapidly marches towards goal of 20,000", Retrieved from: https://www.verizon.com/about/news/verizon-deploys-more-8000-vran-cell-sites, Sep. 12, 2022, 5 Pages.
Tan, et al., "Enable Flexible Spectrum Access with Spectrum Virtualization", The Sixth IEEE Symposium on New Frontiers in Dynamic Spectrum Access Networks, Oct. 16, 2012, pp. 47-58.
Xu, et al., "Magus: minimizing cellular service disruption during network upgrades", In Proceedings of the 11th ACM Conference on Emerging Networking Experiments and Technologies, Dec. 2015, 13 Pages.
Yang, et al., "Predictive Impact Analysis for Designing a Resilient Cellular Backhaul Network", In Proceedings of the ACM on Measurement and Analysis of Computing Systems, vol. 1, Issue 2, Dec. 19, 2017, pp. 1-33.
Zaidi, et al., "OFDM Numerology Design for 5G New Radio to Support IoT, eMBB, and MBSFN", In Journal of IEEE Communications Standards Magazine, vol. 2, Issue: 2, Jun. 2018, pp. 78-83.
"3rd Generation Partnership Project; Technical Specification Group Radio Access Network; NG-RAN; F1 signalling transport (Release 17)", 3GPP Draft; 38472-H10, 3rd Generation Partnership Project (3GPP), Mobile Competence Centre; 650, Route Des Lucioles; F-06921 Sophia-Antipolis Cedex, Sep. 23, 2022, 9 pages.
"3rd Generation Partnership Project; Technical Specification Group Radio Access Network; NG-RAN; Study on enhancement for Resiliency of gNB-CU-CP (Release 18)", 3GPP Standard; Technical Report; 3GPP TR 38.879, 3rd Generation Partnership Project (3GPP), Mobile Competence Centre; 650, Route Des Lucioles; F-06921 Sophia-Antipolis Cedex, Sep. 22, 2022, pp. 1-14.
Ericsson, "TNL solution for FI-C", 3GPP Draft; R3-173959, 3rd Generation Partnership Project (3GPP), Mobile Competence Centre; 650, Route Des Lucioles, vol. RAN WG3, Sep. 29, 2017, 6 pages.
International Search Report and Written Opinion received for PCT Application No. PCT/US2024/030155, Sep. 19, 2024, 18 pages.
International Search Report and Written Opinion received for PCT Application No. PCT/US2024/038261, Oct. 28, 2024, 19 pages.
Lazarev, et al., "Resilient Baseband Processing in Virtualized RANs with Slingshot", ACM SIGCOMM '23: Proceedings of the ACM SIGCOMM 2023 Conference, Sep. 1, 2023, pp. 654-667.
Lazarev, et al., "Resilient Baseband Processing in Virtualized RANs with Slingshot", Microsoft Research Technical Reports, Mar. 3, 2023, pp. 1-16.
Wernet, et al., "Fault-Tolerance in Future RAN: Enabling Redundancy for Efficient Recovery of RAN Network Functions", IEEE Conference on Network Function Virtualization and Software Defined Networks (NFV-SDN), Nov. 7, 2023, pp. 105-110.
Xing, et al., "Enabling Resilience in Virtualized RANs with Atlas", ACM Proceedings of the 29th Annual International Conference on Mobile Computing and Networking, Oct. 2, 2023, pp. 1-15.
Xing, et al., "Enabling Resilience in Virtualized RANs with Atlas", Proceedings of the 31st ACM Conference on User Modeling, Adaptation and Personalization, ACMPUB27, New York, NY, USA, Oct. 2, 2023, pp. 1-15.
Non-Final Office Action mailed on Oct. 8, 2025, in U.S. Appl. No. 18/325,802 14 Pages.

* cited by examiner

DISTRIBUTED UNIT ARCHITECTURE FOR PERFORMING HANDOVER BETWEEN DISTRIBUTED UNITS IN A VRAN

BACKGROUND

Communication networks (e.g., cellular networks) can provide computing devices with access to services available from one or more data networks. A cellular network is typically distributed over geographical areas that often include base stations, radio access networks, core networks, and/or edge networks that collectively provide a variety of services and coverage to end-user devices (e.g., mobile devices). These devices and components of the cellular network provide reliable access to a data network and other communication services by mobile devices over a wide geographic area. In many instances these cellular networks provide mobile devices access to the cloud.

As noted above, cellular networks include a number of network components. For example, cellular networks often include radio access network (RAN) components, which may be implemented through a combination of physical and virtualized components. More recently, and particularly with the advent of more modern telecommunications networks (e.g., 4G, 5G, and future generations of telecommunications networks that employ 3GPP standards), many RAN components are virtualized as services and other functions that are deployed on network resources of a cloud computing system. These virtual RANs (vRANs) allow running RAN processing and other tasks on commodity servers, and are gaining adoption in modern cellular networks.

As cellular networks have grown in popularity and in complexity, demand for faster communication speeds and lower latency has increased. This increase in demand can cause problems in both unplanned events, such as communication failures, as well as planned events, such as performing upgrades on vRAN components. Indeed, one property of modern vRANs often include distributed units that facilitate processing, converting, and communicating wireless signals between components of the cellular network. While these distributed units provide many important features towards the functionality of modern cellular networks (e.g., 4G, 5G, and beyond), distributed units occasionally need to be upgraded and can experience unexpected failures. Existing protocols and conventional architectures in cellular networks are currently unable to accommodate both planned and unplanned instances of distributed units going down without interrupting communication sessions. This is particularly true in telecommunication environments where a single radio unit is being used in conjunction with one or more distributed units to relay communications between a user equipment (UE) and a core network of a cloud computing system.

These and other problems exist in connection with increasing resiliency and implementing planned upgrades in cellular networks, and particularly within virtual RANs (vRANs).

DETAILED DESCRIPTION

Figure 1:
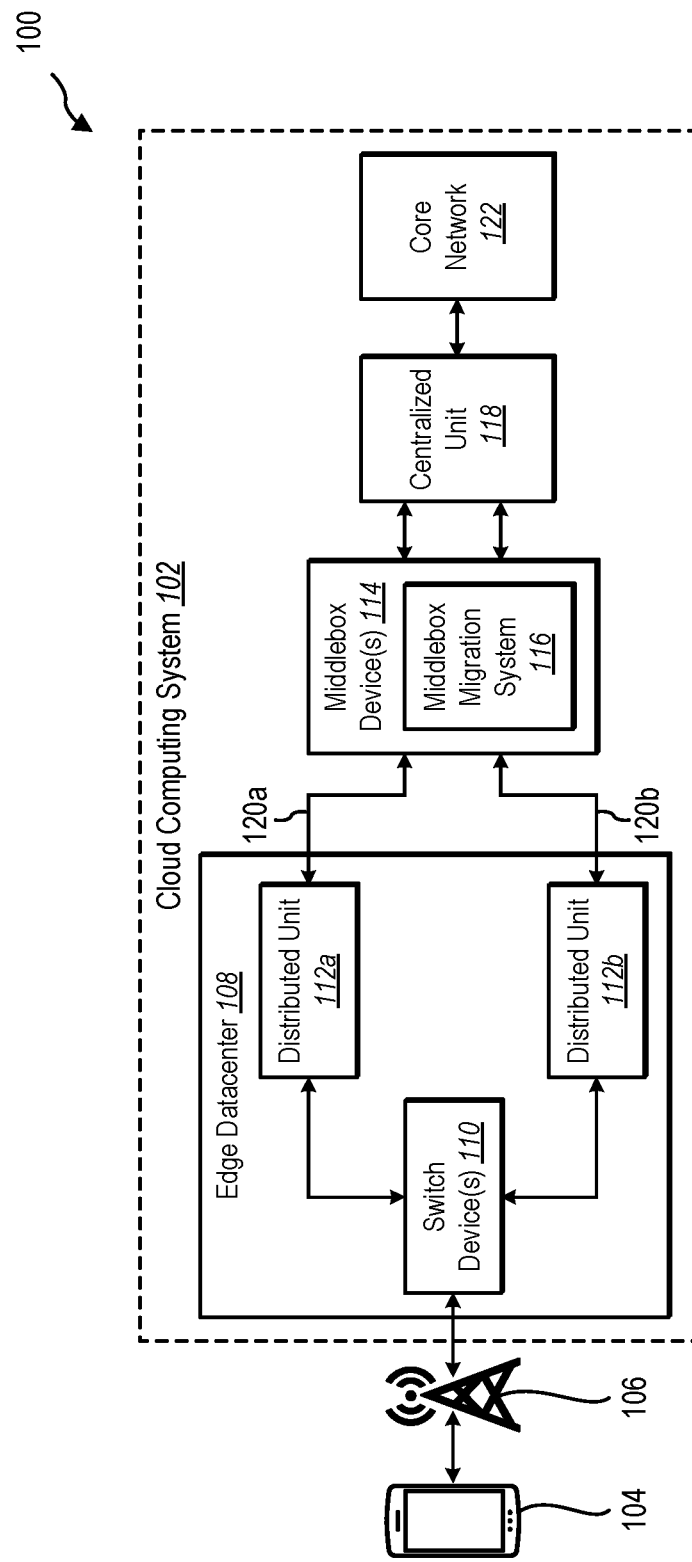
FIG. 1 illustrates an example environment including a middlebox migration system implemented between distributed units and a centralized unit in accordance with one or more embodiments.

The present disclosure relates generally to systems, methods, and computer readable media for handling a handover between two or more distributed units in a virtual radio access network (vRAN) environment including a radio unit, distributed units, and a centralized unit. In particular, as will be discussed in further detail herein, the present disclosure involves implementing a middlebox migration system (e.g., a middlebox entity) in a vRAN environment that facilitates a planned handover between a first distributed unit (e.g., an original distributed unit) and a second distributed unit (e.g., a target or new distributed unit) in such a manner that satisfies hard handover requirements in various telecommunications networks (e.g., 5G networks) while enabling a distributed unit to implement a planned update.

As an illustrative example, systems described herein may be implemented in a telecommunications environment (e.g., a 5G environment) including a plurality of distributed units and a centralized unit in a vRAN. The middlebox entity and/or centralized unit may facilitate preparing for an inter-distributed unit handover involving a switch from communicating network traffic between a radio unit and a first distribute unit to communicating network traffic between the radio unit (e.g., the same radio unit) and a second distributed unit. A handover command may then be issued associated with switching routing of network communications from the first distributed unit to the second distributed unit. An inter-distributed unit handover is then performed in which network traffic is routed via a switch device to the second distributed unit (e.g., where network traffic was previously being routed to the first distributed unit. In one or more implementations, this involves activating a connection to the second distributed unit. In one or more implementations, this includes deactivating a first connection (e.g., an SCTP connection) between the first distributed unit and the centralized unit and activating a second connection (e.g., an SCTP connection) between the second distributed unit and the centralized unit. In one or more embodiments, a planned update, upgrade, or other change is initiated on the first distributed unit after performing the inter-distributed unit handover.

As will be discussed in further detail below, the present disclosure includes a number of practical applications having features described herein that provide benefits and/or solve problems associated with increasing resiliency in a vRAN while facilitating a live-migration between distributed units in a vRAN that are in communication with a common radio unit. It will be appreciated that benefits discussed herein in connection with one or more embodiments are provided by way of example and are not intended to be an exhaustive list of all possible benefits of the middlebox entity and resilient vRAN(s).

For example, by preparing for an inter-distributed unit handover (e.g., based on an indication that an upcoming update is about to happen), the middlebox migration system facilitates a quick and reliable handover between distributed units within a limited time constraint that could otherwise cause a timeout or other failure of communications between one or more UEs and components of a cloud computing system. Indeed, as will be discussed herein, the middlebox migration system facilitates preparation for an inter-distributed unit handover in compliance with handover restrictions (e.g., hard handover restriction) that are typically present in 5G networks.

In addition, by preparing for the inter-distributed unit handover, the middlebox migration system additionally enables handover between two or more distributed units where the distributed units are in communication with a single radio unit. Indeed, where a single radio unit is connected to two or more distributed units in a 5G network, preparing for and implementing the inter-distributed unit handover as discussed herein enables the handover to happen quickly while enabling the radio unit to have awareness of which distributed unit is the active distributed unit both in the moments before and after implementing the inter-distributed unit handover.

In addition to managing communication between a radio unit and the distributed units, the middlebox migration system may establish and manage activity of connections between distributed units and a centralized unit in a manner that enables the new distributed unit to be activated within a very short amount of time in response to the handover trigger (e.g., the planned update, unplanned distribute unit failure). Indeed, by establishing a connection prior to receiving or processing a handover command, the middlebox migration system provides awareness to components in the vRAN in a manner that reduces service interruptions and otherwise increases resiliency in the vRAN.

In addition to providing a quick and efficient transition between distributed units in a manner that increases resiliency in the vRAN, the middlebox migration system provides the above-benefits without causing the second distributed unit to consume unnecessary power or processing resources prior to initiating the live-migration. Indeed, in one or more embodiments, stream control transmission protocol (SCTP) connections are setup in a low-power mode that allows the new distributed unit to be operational within a short period of time, but without expending unnecessary power and computing resources prior to diverting traffic from the old to the new distributed unit(s).

In addition to the above-benefits, the middlebox migration system may be implemented in a variety of networking environments. For example, the middlebox migration system may be implemented on a centralized unit or, alternatively, on a server device communicatively coupled (e.g., wirelessly connected) between a plurality of distributed units and the centralized unit within network topology of the vRAN. Thus, embodiments described herein provide enhanced vRAN resilience responsive to planned and unplanned movement of UE states between distributed units without implementing any complex modifications to existing protocols and can be implemented within the framework of telecommunication standards. Moreover, some implementations of the middlebox migration system are agnostic to particular hardware implementations being adaptable to different hardware models and brands. As noted above, this enables the middlebox migration system to be implemented in a 5G mobile network or other telecommunications networks that make use of distributed units, edge networks, or other components that are becoming increasingly popular in modern communication systems.

As illustrated in the foregoing discussion and as will be discussed in further detail herein, the present disclosure utilizes a variety of terms to described features and advantages of methods and systems described herein. Some of these terms will be discussed in further detail below.

As used herein, a "cloud computing system" refers to a network of connected computing devices that provide various services to computing devices (e.g., customer devices). For instance, as mentioned above, a distributed computing system can include a collection of physical server devices (e.g., server nodes) organized in a hierarchical structure including clusters, computing zones, virtual local area networks (VLANs), racks, fault domains, etc. In one or more embodiments described herein a portion of the cellular network (e.g., a core network) may be implemented in whole or in part on a cloud computing system. A data network may be implemented on the same or on a different cloud computing network as the portion of the cellular network. In one or more embodiments described herein, portions of a RAN (e.g., the vRAN) may be implemented in whole or in part on the cloud computing system.

In one or more embodiments, the cloud computing system includes one or more edge networks. As used herein, an "edge network" or "edge data center" may refer interchangeably to an extension of the cloud computing system located on a periphery of the cloud computing system. The edge network may refer to a hierarchy of one or more devices that provide connectivity to devices and/or services on a datacenter within a cloud computing system framework. An edge network may provide a number of cloud computing services on hardware having associated configurations in force without requiring that a client communicate with internal components of the cloud computing infrastructure. Indeed, edge networks provide virtual access points that enables more direct communication with components of the cloud computing system than another entry point, such as a public entry point, to the cloud computing system. In one or more embodiments described herein, virtualized components of a RAN and core network may be implemented on server nodes of an edge network.

As used herein, a "telecommunications network" may refer to a system of interconnected devices that are distributed over geographical areas and which provide communication and data capabilities to end-user devices (e.g., mobile and non-mobile devices). In one or more embodiments described herein, a telecommunications network refers to a cellular network that includes radio access network (RAN) components, core network components, and network functions implemented on server nodes on the cellular network. In one or more embodiments described herein, the telecommunications network refers specifically to a fifth generation (5G) network environment; however, other implementations may include previous generations (e.g., 2G, 3G, 4G) or future generations (6G and beyond) that make use of network functions implemented on computing devices of the telecommunications network.

In one or more embodiments described herein, an edge network or datacenter may include a number of distributed units deployed as part of a vRAN. The distributed unit may refer to a component that is responsible for handling lower layers of processing functions in the architecture of the vRAN. For example, a distributed unit may be configured to handle a plurality of layers (e.g., physical layer, multi-access edge computing (MEC), the radio link control (RLC) and any other tasks associated with converting wireless signals into packet formats that a centralized unit is configured to process. Indeed, in one or more embodiments described herein, a distributed unit includes lower layers of a vRAN stack including, by way of example, the Physical (PHY), media access control (MAC), and radio access control (RLC) layers.

As used herein, the centralized unit provides centralized functions (e.g., baseband processing, control functions, resource coordination functions) of the vRAN and acts as a central point of management for multiple distributed units and, in some implementations, across multiple edge networks. Indeed, in one or more embodiments, the centralized unit provides virtual RAN services at a central location providing additional flexibility and scalability for the vRAN. In one or more embodiments, a centralized unit services hundreds or thousands of distributed units across one or multiple edge datacenters.

In one or more embodiments described herein, a middlebox migration system facilitates an inter-distributed unit handover between a first distributed unit and a second distributed unit involving a hard handover. As used herein, an inter-distributed unit handover involves a "hard handover," which refers to a type of handover in which a UE transitions completely from communicating via a first distributed unit to communicating via a second distributed unit from one communication to a next communication. In particular, in a communication environment where the UE can only communicate via one cell at a time, a hard handover would involve a plurality of consecutive communications leading up to the hard handoff to be communicated via a first distributed unit. Then, after a break or cutoff in communications to the first distributed unit, the hard handover would follow with a plurality of next consecutive communications being communicating via a second distributed unit.

In one or more embodiments described herein, the break or cutoff in communications is described as a deactivation of a connection between the radio unit and a distributed unit. Deactivating a connection may involve breaking a connection, disconnecting endpoints, or simply stopping communication of network traffic between a radio unit and a distributed unit (e.g., via a switch device). Similarly, activating a connection may involve establishing a connection, re-establishing a connection, initiating a previously established connection, and/or causing communication of network traffic via a connection between a radio unit and distributed unit.

As used herein, an inter-distributed unit handover involves a hard handover in combination with preparation and reconfiguration of various components involved in re-routing network traffic (e.g., fronthaul traffic) from a first distributed unit to a second distributed unit. More specifically, in one or more implementations described herein, an inter-distributed unit handover involves preparing for a handover between distributed units, and reconfiguring various components, such as a switch device, to re-route fronthaul traffic of a radio unit between a first distributed unit to a second distributed unit. Various examples of inter-distributed unit handovers involve a hard handover between two or more distributed units (e.g., involving the same radio unit) are discussed in further detail herein.

As noted above, a hard handover in the context of a 5G cellular network would involve a process of performing this handover between distributed units without an interruption in service to ensure continuity in a connection between a UE and the centralized unit or other components on a cloud computing system. As will be discussed below, and as just mentioned above, examples of inter-distributed unit handovers described herein may involve causing a switch mechanism (e.g., an Ethernet switch, fronthaul network switch) to switch between routing fronthaul communications received from the radio unit to a first distributed unit to routing the fronthaul communications received from the same radio unit to a second distributed unit. In addition, the hard handover may involve switching which of the distributed units is in communication with a centralized unit.

Additional detail will now be provided regarding systems described herein in relation to a middlebox migration system that facilitates preparation for an inter-distributed unit handover responsive to an update, upgrade, or other modification to one or more distributed units in a vRAN within a telecommunications network environment. For example, FIG. 1 illustrates an example environment 100 for implementing features and functionality of a middlebox migration system in accordance with one or more embodiments described herein. As shown in FIG. 1, the environment 100 illustrates example portions of a cellular network, which may be implemented in whole or in part on a cloud computing system 102.

For example, the environment 100 includes a user equipment 104 (or simply "UE 104"), a radio unit 106, and edge datacenter 108 having switch device(s) 110 (e.g., front-haul device(s)) and distributed units 112a-b implemented thereon. The environment 100 additionally includes a middlebox device(s) 114 having the middlebox migration system 116 implemented thereon and a centralized unit 118 in communication with the middlebox migration system 116 and distributed units 112a-b. As shown in FIG. 1, the centralized unit 118 is connected to a core network 122 of the cellular network, which can also be implemented in whole or in part on the cloud computing system 102. While not shown in FIG. 1, some portions or components of the core network 122 may be implemented as virtualized services or network functions on server nodes on the edge datacenter 108. For simplicity in the description that follows, the core network 122 may be implemented generally on the cloud computing system 102, though some embodiments may include the core network 122 being implemented across a combination a central datacenter and one or more edge networks-. The components 106-122 of the cellular network may collectively form a public or private cellular network and, more specifically, make up components of a RAN (inclusive of the vRAN) and core network 122.

The UE 104 (e.g., client device) may refer to a variety of computing devices or end-user devices. For example, the UE 104 may refer to a mobile or non-mobile user device, such as a laptop, desktop, phone, tablet, information of things (IoT) device, or other device capable of communicating with devices on the cloud computing system 102 via one or more access points, such as the radio unit 106 and/or components of the vRAN. Alternatively, the UE 104 may refer to a server device or other non-mobile computing device that is not on the cloud computing system 102, but which serves as an end-user device. Additional detail in connection with general features and functionalities of a computing device, such as the UE 104, is discussed below in connection with FIG. 7.

The radio unit 106 may refer to one or more components of a device or system of devices that are tasked with providing an access point to other devices of a cellular network (e.g., devices of the cloud computing system 102). More specifically, the radio unit 106 may refer to a base station or cell station associated with a particular area of coverage or any physical access point of a RAN through which the UE 104 communicates with devices on the cellular network or core network 122. In one or more embodiments, the radio unit 106 refers to a base station through which a UE 104 communicates through one or more distributed units, centralized unit, or other components of a vRAN described herein.

As noted above, the edge datacenter 108 may refer to a portion of the cloud computing system 102 near or proximate to end-users while providing connectivity to internal or remote portions of the cloud computing system 102. The edge datacenter 108 may include any number of servers having network functions, virtual machines, or other components thereon that provide connectivity and communication capabilities between the UE 104 and services or devices at a lower latency than conventional systems in which a UE communicates directly with components or devices on a more remote datacenter.

As noted above, the edge datacenter 108 may be referred to interchangeably as an edge network. While one or more embodiments described herein refer specifically to implementations of a vRAN in which components such as distributed units, front haul devices, centralized units, etc. are implemented on the edge datacenter 108, the features described herein may be implemented on a centralized datacenter or otherwise less centralized or distributed implementation of a cloud computing system 102.

As shown in FIG. 1, the edge datacenter 108 includes one or more switch device(s) 110 and a number of distributed units 112a-b hosted thereon. The switch device(s) 110 may refer to one or more devices tasked with handling routing, switching, and other communication directing tasks associated with providing communications received from a UE 104 (via the radio unit 106) to one or more distributed units 112. In one or more implementations, the switch device(s) 110 refers to one or more front-haul devices. In one or more embodiments, the switch device(s) 110 refers to a network function (e.g., a front haul network function) that facilitates delivery of communications via general purpose computing devices (e.g., an edge server node). Other implementations of the switch device(s) 110 may be implemented on specialized hardware specifically configured or otherwise tasked with performing front haul related tasks in the vRAN. In one or more embodiments, the switch device(s) 110 includes an Ethernet switch positioned between the radio unit 106 and the distributed units 112a-b.

As just mentioned, the edge datacenter 108 includes a number of distributed units 112a-b, which (also discussed above) may refer to devices or functions that are configured to handle a plurality of lower layers of protocol in providing or otherwise managing communications between devices of a cellular network. While FIG. 1 illustrates and example showing a first distributed unit 112a and a second distributed unit 112b, other examples include additional distributed units on a given edge datacenter. In addition, while not shown in FIG. 1, the edge datacenter 108 may include multiple pairs of original and new distributed units similar to first and second distributed units 112a-n discussed herein. In one or more embodiments, the first distributed unit 112a is referred to as an original or source distributed unit while the second distributed unit 112b is referred to as a new or target distributed unit.

Also shown in FIG. 1, and as noted above, the environment 100 includes a centralized unit 118. The centralized unit 118 may refer to a unit on the cloud computing system 102 (e.g., on a central datacenter) that manages operation of any number of distributed units and other vRAN components. The centralized unit 118 may provide baseband processing, control functions, resource coordination functions, or simply provide a central point of management for any number of distributed units on the edge datacenter 108 and, in some cases, across multiple edge datacenters having distributed units deployed thereon.

While one or more embodiments of the cloud computing system 102 may include distributed units that are distributed across multiple edge datacenters 108 that are connected to and/or otherwise serviced by the same centralized unit 118, one or more embodiments described herein refer specifically to a plurality of distributed units (e.g., first and second distributed units 112a-b) that are serviced by the same radio unit 106. For example, one or more examples described herein refer specifically to an original or old distributed unit (a first distributed unit 112a) and a new or target distributed unit (a second distributed unit 112b) on the same edge datacenter 108 (or across multiple edge datacenters) that are in communication with a common radio unit 106 before and after performing a handover. More specifically, as will be discussed below, the first distributed unit 112a is in communication with the radio unit 106 prior to performing the handover while the second distributed unit 112b is in communication with the same radio unit 106 after performing the handover.

Additional detail will now be given in connection with the middlebox migration system 116 on a middle box device(s) 114 in connection with other components of the vRAN, as shown in FIG. 1. Further details will also be discussed below in connection with an example implementation shown in FIG. 2. It will be appreciated that the middlebox device(s) 114 may refer to one or multiple server devices (e.g., server node(s)) on the cloud computing system 102 on which features of the middlebox migration system 116 are implemented.

In one or more embodiments, the middlebox migration system 116 refers to a software application, software package, or other service hosted or provided by a server device (e.g., the middlebox device(s) 114) on the cloud computing system 102. As noted above, the middlebox migration system 116 provides features and functionality associated with increasing resiliency of the distributed units 112a-b on the edge datacenter 108 when performing an inter-distributed unit handover between respective distributed units pursuant to initiating an update, upgrade, or other modification on a first distributed unit 112a of the multiple distributed units 112b.

As will be discussed in further detail below, the middlebox migration system 116 can facilitate preparation of each of the distributed units 112a-b and centralized unit 118 for a handover operation. For example, the middlebox migration system 116 may prepare the distributed units 112a-b for a handover by copying or otherwise moving UE context data from an original distributed unit to a new distributed unit. In one or more implementations, this preparation involves copying or installing states of UEs that are engaged or otherwise in communication with the first distributed unit 112a to a storage of the second distributed unit 112b. By installing states of UEs or otherwise storing context on the second distributed unit 112b, the middlebox migration system 116 enables a quick transition from the first distributed unit 112a to the second distributed unit 112b, which is particularly important in the event of embodiments described herein when the radio unit 106 makes a complete transition between communicating with the first distributed unit 112a to communicating with the second distributed unit 112b from one communication to a next communication.

In addition to preparing for the inter-distributed unit handover, the middlebox migration system 116 may further monitor when a handover command is issued and/or whether an inter-distributed unit handover process has been initiated. Indeed, rather than relying on the centralized unit 118 and/or second distributed unit 112b to have cooperative awareness of the state of the inter-distributed unit handover, the middlebox migration system 116 can monitor the handover state and issue a toggle command to the switch device(s) 110 within a very short amount of time after a connection with the first distributed unit and other components of the vRAN has been broken. This allows for a relatively short amount of downtime between deactivating a first connection and activating a second connection, thus allowing transfer between distributed units 112a-b for a communication session with a UE to be uninterrupted and stable.

In one or more embodiments, the middlebox migration system 116 further increases resiliency of the vRAN in preparation for a handover scenario by establishing connections between the distributed units 112a-b and the centralized unit 118. For example, as shown in FIG. 1, the middlebox migration system 116 establishes a first connection 120a between the first distributed unit 112a and the centralized unit 118. This first connection 120a may refer to an original or old connection that enables the first distributed unit 112a to communicate with or otherwise interact with (and be managed by) the centralized unit 118. In addition to the first connection 120a, the middlebox migration system 116 may establish a second connection 120b between the second distributed unit 112b and the centralized unit 118. The second connection 120b may refer to a secondary, backup, or simply new connection that enables the second unit (e.g., the second distributed unit 112b) to communicate with or otherwise interact with (and be managed by) the centralized unit 118 as soon as the inter-distributed unit handover process is completed.

In one or more embodiments, the connections 120a-b refer to stream control transmission protocol (SCTP) connections that are established between the respective distributed units 112a-b and the centralized unit 118. For example, the middlebox migration system 116 may establish a first SCTP connection between the first distributed unit 112a and the centralized unit 118 and establish a second SCTP connection between the second distributed unit 112b and the centralized unit 118. The SCTP connections may be established prior to initiating an inter-distributed unit handover process. For example, the SCTP connections may be established as part of a process of preparing for handover.

In one or more embodiments, the SCTP connections are established well in advance of preparing for a handover and, in some cases, may be independent of any preparation for an inter-distributed unit handover. Indeed, in one or more embodiments, the SCTP connections are established in preparation for an unplanned switch between the respective distributed units 112a-b, such as based on a detected failure condition of a particular distributed unit or other unplanned scenario in which a first distributed unit needs to be switched out in favor of a second distributed unit.

By establishing the SCTP connections and performing other preparations for inter-distributed unit handover between the distributed units 112a-b, the middlebox migration system 116 enables both the distributed units 112a-b to quickly establish communication with the centralized unit 118 in the event of unexpected failures or in response to a detected instance of an inter-distributed unit handover. In one or more embodiments, prior to switching between the distributed units, the second distributed unit 112b may operate in a standby or low power mode for some indefinite period of time until the connection with the first distributed unit is broken 112a. By pre-emptively establishing the second SCTP connection, the second distributed unit may simply power up or transition from the standby or low power mode to an operational or active mode, thus enabling the second distributed unit 112b to quickly and efficiently resume communication session(s) involving the UE 104 (and other end-user devices) and the centralized unit 118.

As noted above, in one or more embodiments, the middlebox migration system 116 refers to a software application or software package that is implemented on one or across multiple server devices. For example, the middlebox migration system 116 may be implemented as a service or network function installed on a server node of the cloud computing system 102. In one or more embodiments, each of different discrete features of the middlebox migration system 116 can be implemented as separate or distinct software applications or packages on a single or across multiple server devices. As an example, in one or more embodiments, the middlebox migration system 116 is implemented on a single server device. As another example, a first portion of the middlebox migration system 116 (e.g., a portion dedicated to detecting a handover command and/or preparing for handover) is implemented on a first server device while a second portion of the middlebox migration system 116 (e.g., a portion dedicated to establishing the SCTP connections) is implemented on a second server device. Other implementations may include additional or fewer devices.

Figure 2:
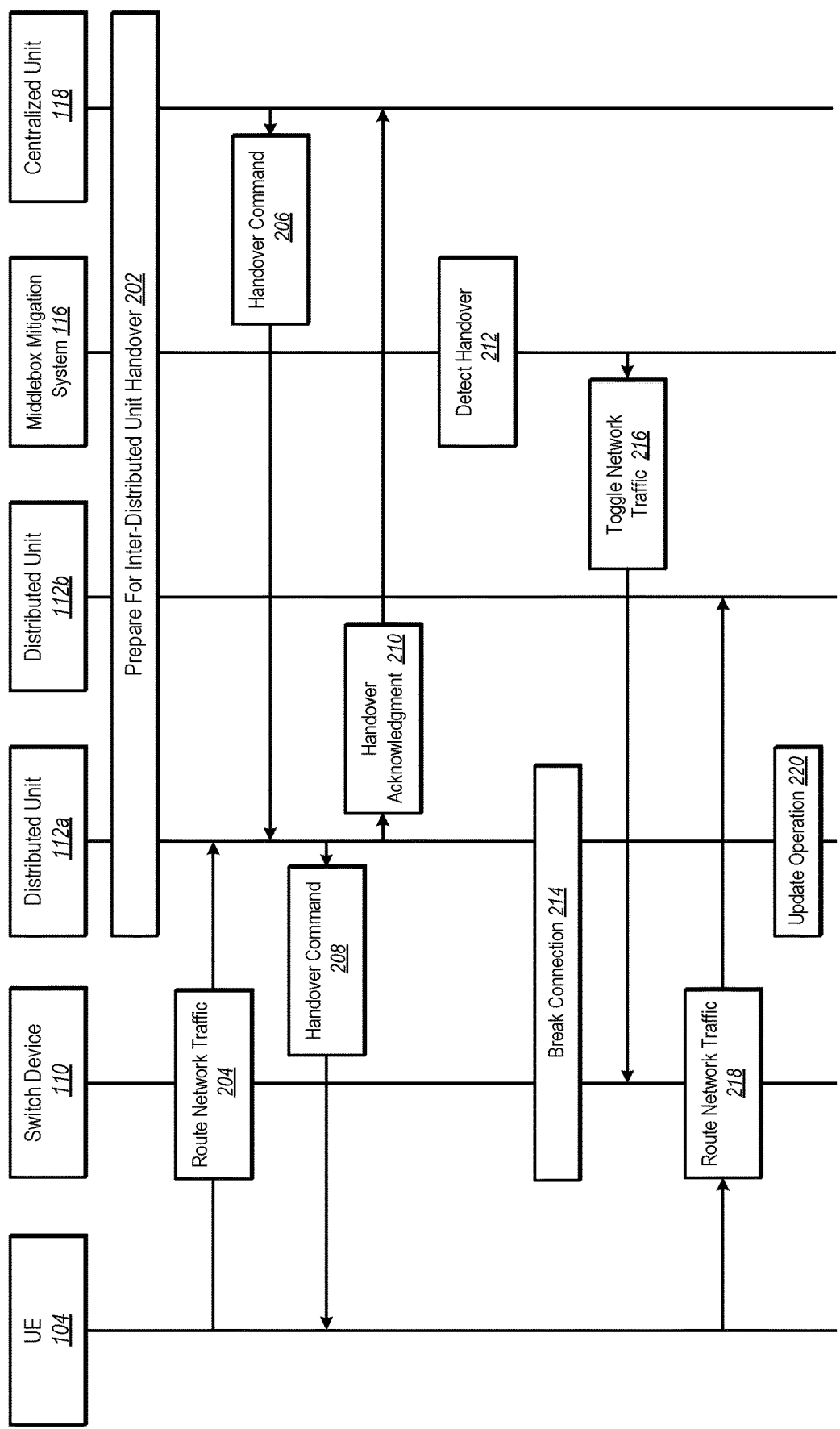
FIG. 2 illustrates an example implementation of the middlebox migration system shown in FIG. 1 in accordance with one or more embodiments.

Additional detail will now be discussed in connection with an example implementation in which the distributed units 112a-b, the centralized unit 118, and the middlebox resiliency system 116 communicate with one another in a manner that increases resilience of the vRAN. In particular, FIG. 2 illustrates an example implementation in which multiple distributed units 112a-b, a centralized unit 118, and the middlebox resiliency system 116 cooperatively increase the resilience of the vRAN on which the respective components are implemented. The distributed units 112a, centralized unit 118, and middlebox resiliency system 116 may include similar features as shown in the examples illustrated and discussed in connection with FIG. 1.

While the environment shown in FIG. 2 (and discussed in FIG. 1) shows two distributed units 112a-b, it will be appreciated that the edge datacenter 108 may include any number of distributed units 112a-b. Moreover, in one or more embodiments, the second distributed unit 112b may refer to any of a number of distributed units that are configured to act as a handover distributed unit (e.g., a new or target distributed unit) to the first distributed unit 112a such that network traffic can be handed over from the first distributed unit 112a to any number of a set of second distributed units. In one or more embodiments, the second distributed unit 112b is in an inactive state prior to initiating the handover process.

Moreover, while not shown in FIGS. 1-2, the second distributed unit 112b may refer to one or more distributed units that may act as a new or target distributed unit to any number of distributed units having similar functionality as the first distributed unit 112a. For example, in one or more embodiments, a second distributed unit 112b may serve as a target distributed unit to more than just the first distributed unit 112a such that any of a number of distributed units that need to be upgraded or otherwise modified can do so as long as there is a distributed unit capable of serving as a handover distributed unit in accordance with one or more embodiments described herein. Additional detail will now be discussed in connection with handing off network traffic from a first distributed unit 112a to a second distributed unit 112b. Nonetheless, features discussed in connection with these examples can be applied to other environments including additional distributed units, including one or multiple first distributed units (e.g., old or original distributed units) and one or multiple second distributed units (e.g., new or target distributed units).

As shown in FIG. 2, the distributed units 112a-b, middlebox migration system 116, and centralized unit 118 perform an act 202 of preparing for an inter-distributed unit handover in accordance with one or more embodiments. In particular, the middlebox migration system 116 (and other components) may cooperatively prepare for a handover involving a switch from communicating network traffic between a radio unit and a first distributed unit 112a to communicating network traffic between the radio unit (e.g., the same radio unit) and a second distributed unit 112b.

Preparing for the inter-distributed unit handover may involve a number of actions associated with preparing for a fast and non-disruptive handover. In one or more embodiments, preparing for the handover includes the middlebox migration system 116 establishing a plurality of connections between the distributed units 112a-b and the centralized unit 118. For instance, in an effort to avoid establishing a new communication channel between the distributed units 112a-b and the centralized unit 118, the middlebox migration system 116 may pre-establish connections (e.g., stream control transmission protocol (SCTP)) connections between the centralized unit 118 and each of a plurality of distributed units. Prior to performing the handover, a first connection (e.g., a first SCTP connection) may be active with communications being transmitted over the first connection between the first distributed unit 112a and the centralized unit 118. After performing the handover, the second connection (e.g., a second SCTP connection) may be activated (e.g., from a sleep or otherwise inactive or dormant state) to cause communications to be transmitted via the second connection.

In addition to establishing connections or other communication channel between the centralized unit 118 and the respective distributed units 112a-b, the middlebox migration system 116 may cause a plurality of UE states be installed on the target or new distributed unit that will be the active distributed unit after performing the handover. In one or more embodiments, this is referred to as a context setup, which may be performed responsive to a context setup request). For example, where the first distributed unit 112a is the active distributed unit and a handover involves transitioning between communicating via the first distributed unit 112a to communicating via the second distributed unit 112b, the UE states previously stored or otherwise maintained on the first distributed unit 112a may be stored on the second distributed unit 112b. This pre-emptive migration of UE states (e.g., the context setup response) enables the second distributed unit 112b to quickly transition to handling communications from any number of UEs that were previously communicating with (via a radio unit) the first distributed unit 112a (e.g., prior to performing the handover).

Initiating the act 202 of preparing for handover may be triggered by a number of scenarios. For example, in one or more embodiments, the event is a planned even in which a first distributed unit needs to go offline for some reason, such as performing an update, upgrade, or other modification to the first distributed unit 112a. In one or more embodiments described herein, the trigger for performing the migration or handover from the first distributed unit 112a to the second distributed unit 112b involves receiving an indication or otherwise determining that an update operation is to be performed on the first distributed unit 112a. This update may involve operations that need to be performed on the first distributed unit 112a and/or applications running on the first distributed unit of a nature that could (or likely would) cause interruptions in service between one or more UEs (e.g., UE 104) and other components on a cloud computing system.

FIG. 2 further illustrates acts performed prior to implementing a handover. For example, prior to performing the handover, the switch device 110 performs an act 204 of routing network traffic between the UE 104 and the first distributed unit 112a. In one or more embodiments, the switch device 110 is an Ethernet switch or other fronthaul router that routes or otherwise directs network traffic received from the UE 104 (and other UEs via the same radio unit) to the first distributed unit 112a.

As shown in FIG. 2, the first distributed unit 112a performs an act 206 of receiving a handover command. In one or more embodiments, the handover command is issued by the centralized unit 118 tasked with managing the first distributed unit 112a. As noted above, the handover command includes an indication or instructions associated with switching routing of network communications using a first distributed unit 112a to a second distributed unit 112b. In one or more embodiments, the handover command further includes instructions or an indication to switch between a first connection (e.g., a first SCTP connection) between the first distributed unit 112a and the centralized unit 118 to a second connection (e.g., a second SCTP connection) between the second distributed unit 112b and the centralized unit 118.

Upon receiving the handover command, the first distributed unit 112a performs an act 208 of communicating the handover command to the UE 104. In one or more embodiments, the handover command is communicated to the UE 104 via a radio unit. In one or more embodiments, the radio unit does not process or read the instructions to perform the handover, but simply routes the handover command to the UE 104. Indeed, in one or more embodiments, the radio unit is unaware of which distributed unit is actively receiving or communicating network traffic to and from the UE 104.

In addition to providing the handover command to the UE 104, the first distributed unit 210 can provide an acknowledgement of the handover to the centralized unit 118. In one or more embodiments, this is provided upon confirmation that the handover command has been received by the UE 104. In one or more embodiments, this acknowledgement is provided simply to indicate that the handover command has been successfully received by the first distributed unit 112a and/or successfully transmitted from the distributed unit 112a to the UE 104.

As shown in FIG. 2, the middlebox migration system 116 performs an act 212 of detecting the handover. The middlebox migration system 116 may detect that the handover command has been issued or otherwise executed in a variety of ways. In one or more embodiments, the middlebox migration system 116 detects that handover command has been sent based on the centralized unit 118 sending the handover command. In one or more embodiments, the middlebox migration system 116 maintains communication with the first distributed unit 112a and detects that the handover command has been received and/or transmitted to the UE 104. In one or more embodiments, the middlebox migration system 116 detects transmission of the handover acknowledgement message. In one or more embodiments, the middlebox migration system 116 detects that the handover command has been sent based on the middlebox migration system 116 involvement in the handover preparation.

As shown in FIG. 2, the system(s) and device(s) may perform an act 214 of breaking a first connection with a first distributed unit 112a. In one or more embodiments, the act 214 involves breaking a connection or discontinuing communications between a radio unit and the first distributed unit 112a. In one or more embodiments, breaking the first connection involves discontinuing transmission of network traffic being routed to the first distributed unit 112a (via the switch device 110). For example, the act 214 may involve simply stopping, by the switch device 110, routing network traffic from the radio unit to the first distributed unit 112a.

As shown in FIG. 2, the middlebox migration system 116 may perform an act 216 of toggling network traffic from the first distributed unit 112a to the second distributed unit 112b. For example, the middlebox migration system 116 may send a command or otherwise provide instructions to the switch device 110 associated with switching between routing network traffic to the first distributed unit 112a to routing network traffic to the second distributed unit 112b. As shown in FIG. 2, the switch device 110 can perform an act 218 of routing network traffic from the UE 104 to the second distributed unit 112b.

While FIG. 2 primarily shows the acts related to handing off communications between a radio unit and each of the distributed units 112a-b, the handover may additionally include a handover of communications between the respective distributed units 112a-b and the centralized unit 118. For example, as noted above, SCTP connections may be established between each of the distributed units 112a-b and the centralized unit 118 in anticipation of the handover (e.g., a planned or unexpected handover). Prior to or just after breaking the connection between the switch device 110 and the first distributed unit 112a, the middlebox migration system 116 may facilitate breaking communications between the first distributed unit 112a and the centralized unit 118 by shutting down the SCTP connection between the first distributed unit 112a and the centralized unit 118. In one or more embodiments, this may involve sending a shutdown signal to the centralized unit 118 to clear a state of the first distributed unit 112a on the centralized unit 118.

In one or more embodiments, the middlebox migration system 116 may facilitate activating a second SCTP connection that was also setup as part of the preparation for handover. In this example, the middlebox migration system 116 may activate the second SCTP connection right after performing acts 214-216 and just before or otherwise concurrent with the act 218 of routing network traffic from the UE 104 to the second distributed unit 112b.

In one or more embodiments activating this second SCTP connection involves reconfiguring the second distributed unit in a manner that enables the second distributed unit 112b to fill in and perform similar features as the first distributed unit 112a prior to becoming disconnected from the UE 104. For example, the middlebox migration system 116 may cause one or more configuration parameters of the first distributed unit 112a to be applied to the second distributed unit 112b, such as modifying a communication frequency or otherwise reconfiguring the second distributed unit 112b to operate in a similar manner as the first distributed unit 112a.

As noted above, the process of switching network traffic may involve an inter-distributed unit handover between the first distributed unit 112a and the second distributed unit 112b. As discussed above, an inter-distributed unit handover involves switching between the distributed units 112a-b such that there is a complete handoff between the distributed units 112a-b from one communication (e.g., a discrete communication, such as a network packet) to a next communication. Thus, each instance of network traffic prior to performing a hard handover will be routed from the UE 104 to the first distributed unit 112a while each instance of network traffic after performing the hard handover will be routed from the UE 104 to the second distributed unit 112b. The routing may be agnostic to the radio unit.

As shown in FIG. 2, after performing the hard handover and initiating routing of traffic to the second distributed unit 112b, the first distributed unit 112a may now be available to perform an update, upgrade, or other modification while the second distributed unit 112b has taken over the network tasks being performed by the first distributed unit prior to performing the hard handover. As shown in FIG. 2, the first distributed unit 112a may perform an act 220 of initiating or otherwise carrying out a planned update operation. As noted above, act 220 is initiated and performed after performing the hard handover between the first distributed unit 112a and the second distributed unit 112b. While FIG. 2 shows an example of an upgrade operation, the process described herein for carrying out a planned handover may be performed in preparation for any change, update, upgrade, installation, or other modification made to the first distributed unit 112a or application running or otherwise executable on the first distributed unit 112a.

Figure 3:
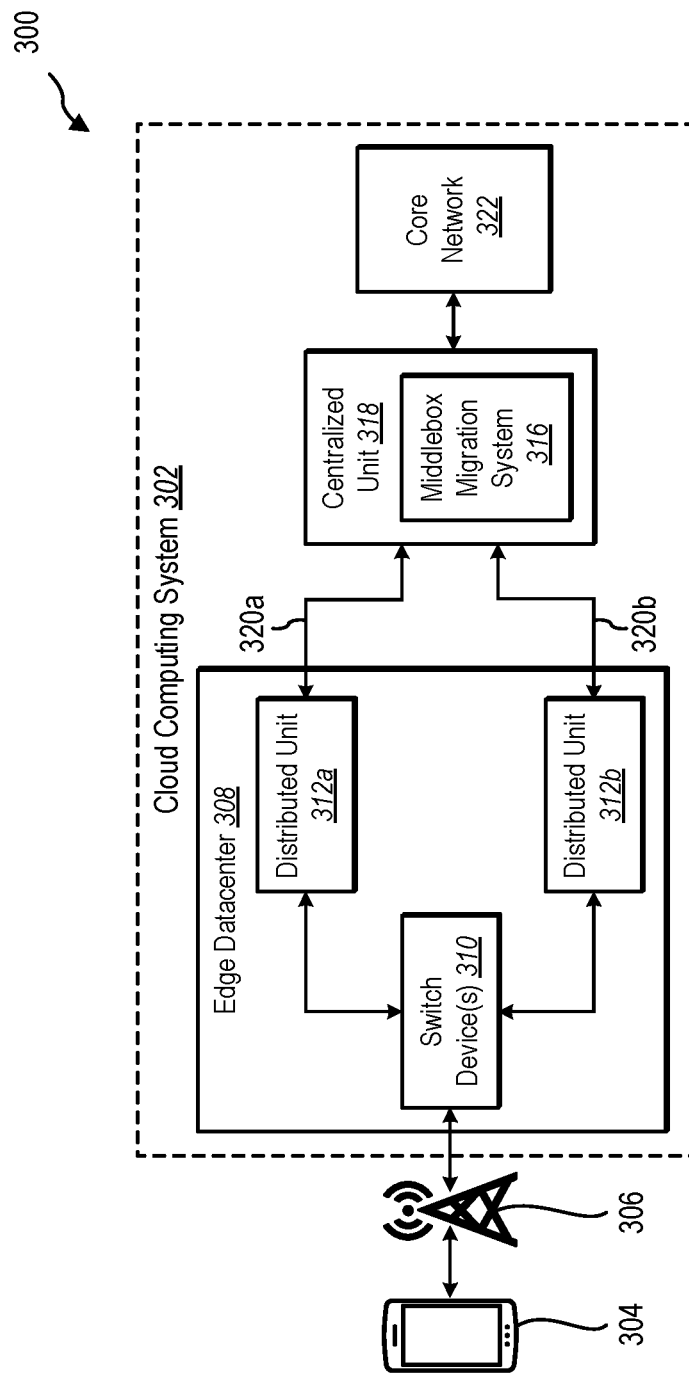
FIG. 3 illustrates an example environment including a middlebox migration system implemented on a centralized unit in accordance with one or more embodiments.
Figure 4:
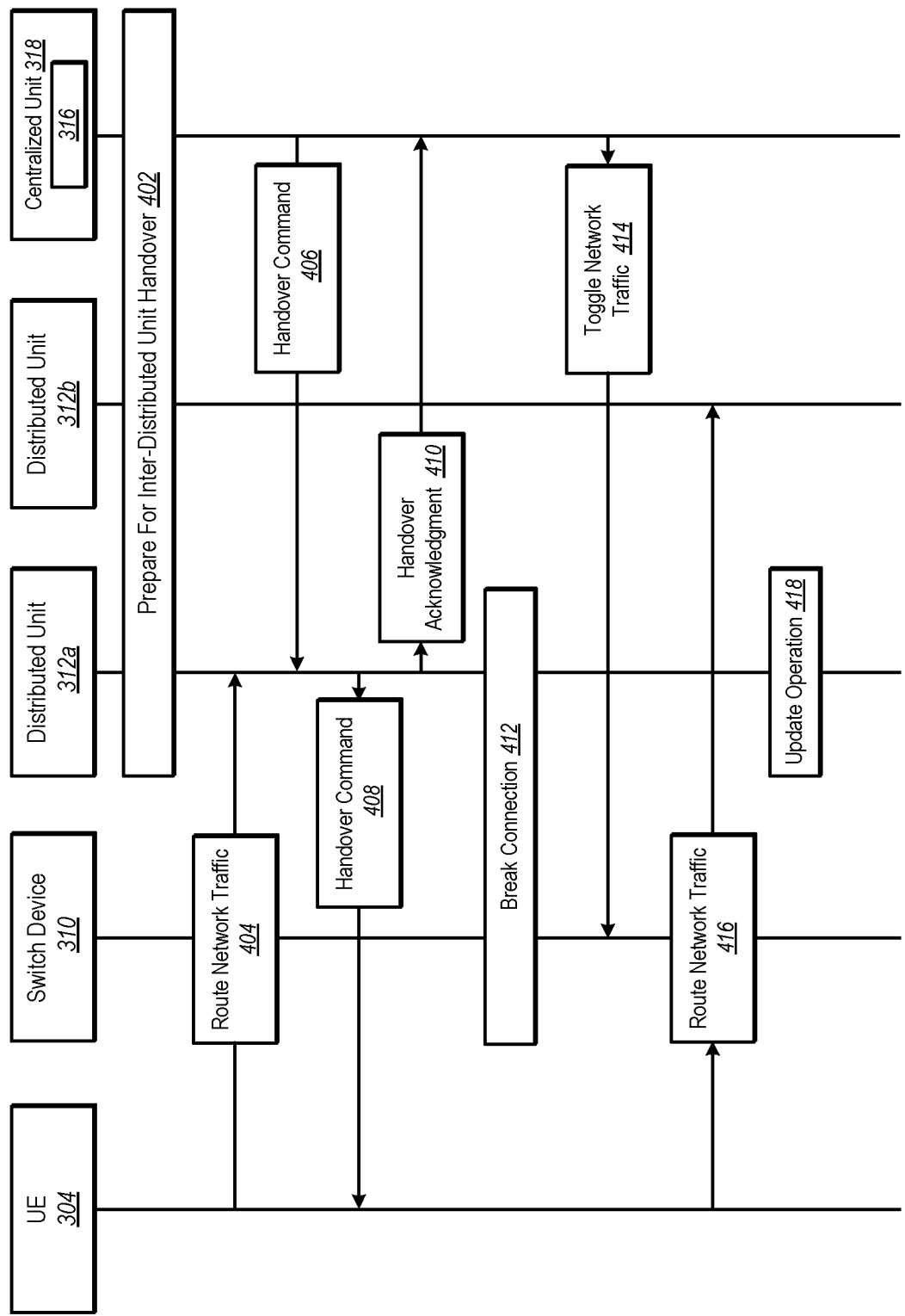
FIG. 4 illustrates an example implementation of the middlebox migration system shown in FIG. 3 in accordance with one or more embodiments.

Additional detail will now be discussed in connection with an example implementation of the middlebox migration system 116 in accordance with one or more embodiments described herein. In particular, FIGS. 3-4 illustrate an example implementation of a telecommunications network in which a middlebox migration system is implemented on a centralized unit of a vRAN on a cloud computing system. It will be appreciated that features described in connection with FIGS. 3-4 may be applicable to one or more embodiments described above in connection with FIGS. 1-2. Moreover, one or more features and functionalities described above in connection with FIGS. 1-2 may be applicable to the example(s) shown and discussed in connection with FIGS. 3-4.

Similar to FIG. 1, FIG. 3 illustrates an example environment 300 in which a middlebox migration system 316 is implemented in accordance with one or more embodiments. As shown in FIG. 3, the environment 300 may include a user equipment 304 (or simply "UE 304") and a radio unit 306 that provides access to components on a cloud computing system 302 to the UE 304. Similar to FIG. 1, the components shown within the cloud computing system 302 may include components of a vRAN, which may provide communication capabilities of the UE 304 to the core network 322 and other internal components of the cloud computing system 302.

As shown in FIG. 3, the environment 300 further includes an edge datacenter 308 having one or more switch device(s) 310 (e.g., Ethernet switches, front haul devices) and a plurality of distributed units 312a-b. The distributed units 312a-b may include a first distributed unit 312a (e.g., an old or original distributed unit) and a second distributed unit 312b (e.g., a new or target distributed unit). It will be understood that each of the UE 304, radio unit 306, edge datacenter 308, switch device(s) 310, and distributed units 312a-b may include similar features as corresponding components discussed above in FIG. 1. In addition, the core network 322 may provide similar features and functionality as the core network 122 discussed above in connection with the environment 100 shown in FIG. 1.

In contrast to FIG. 1, the environment 300 includes a centralized unit 318 having the middlebox migration system 316 implemented thereon. Thus, rather than the middlebox migration system 316 acting as a middlebox entity positioned between the distributed units 312*a-b* and the centralized unit 318, the middlebox migration system 316 may be implemented as a software package or set of features that are implemented directly on the centralized unit 318 (or on a server device on which the centralized unit 318 is hosted).

As shown in FIG. 3, the middlebox migration system 316 may establish a first connection 320*a* between the first distributed unit 312*a* and the centralized unit 318. The middlebox migration system 316 may also establish a second connection 320*b* between the second distributed unit 312*b* and the centralized unit 318. The respective connections may refer to SCTP connections and may share similar features as the connection 120*a-b* discussed above in connection with FIG. 1.

Each of the above examples of the middlebox migration system 316 implemented on a separate device (e.g., as shown in FIG. 1) or within the centralized unit 318 (as shown in FIG. 3) provide a variety of benefits. For example, where the middlebox migration system 316 is implemented as a standalone entity on a service device positioned between distributed units and a centralized unit, the middlebox migration system 316 facilitates features that enable fast and efficient handover between distributed units in communication with the same radio unit in a manner that is agnostic to the radio unit. Indeed, the middlebox migration system provides a framework that enables detection of a handover command and which can orchestrate a speedy handover, even a hard handover, between distributed units without interrupting service to a UE and without causing any connections to the centralized unit to timeout as would be the case with conventional systems. The middlebox migration system facilitates the above functions without requiring a new centralized unit and/or switch device framework while enhancing resiliency of the vRAN.

Alternatively, in the example shown in FIG. 3 in which the middlebox migration system is implemented within a centralized unit, the above-features similarly enhance resiliency of the vRAN when performing planned (and unplanned) handovers between distributed units. This is particularly applicable when performing a handover between distributed units in communication with the same radio unit as a hard handover is often involved in instances of the inter-distributed unit handovers described herein, the coordination of which is provided by adding the functionality of the middlebox migration system to the centralized unit already implemented within the conventional framework of the vRAN. Moreover, by adding the middlebox migration system to the centralized unit, the centralized unit can provide a flexible and adaptable approach to increasing resiliency in a manner which is scalable, flexible, and adaptive to different environments with different timing constraints as well as being applicable to a variety of services and any number of distributed units that may be applicable to a given situation.

Moving on, FIG. 4 illustrates an example implementation in accordance with the example shown in FIG. 3 in which a middlebox migration system 316 on a centralized unit 318 can be used to facilitate a planned handover between distributed units in a manner that improves resiliency within a vRAN having any number of distributed units implemented thereon. It will be appreciated that each of the radio unit UE 304, switch device 310, distributed units 312*a-b*, and centralized unit 318 may provide similar features as corresponding components discussed in previous examples. It will also be appreciated that similar acts described in connection with FIG. 4 may have similar features and functionalities as corresponding acts described above in connection with FIG. 2. Moreover, one or more features described in connection with the example shown in FIG. 4 may be applicable to the example implementations described above in connection with FIG. 2. Similarly, features described in connection with FIG. 4 may also be applicable to previous examples described herein.

As shown in FIG. 4, the centralized unit 318 performs an act 402 of preparing for an inter-distributed unit handover in accordance with one or more embodiments. In particular, the centralized unit 318 prepares for the inter-distributed unit handover cooperatively with the first distributed unit 312*a* and the second distributed unit 312*b*. Similar to the act 202 discussed above in connection with FIG. 2, the act 402 of preparing for the inter-distributed unit handover may involve any number of acts that prepare for a handover involving a switch or transition from communicating network traffic to and from the first distributed unit 312*a* to communicating network traffic to and from the second distributed unit 312*b*.

For example, the act 402 of preparing for the inter-distributed unit handover may involve establishing SCTP channels between any number of distributed units and the centralized unit 318 in preparation for quickly activating a target or new distributed unit responsive to deactivating or otherwise stopping communications from being transmitted between the old or original distributed unit and the centralized unit 318 as part of the handover process. Also similar to the examples described above, the centralized unit 318 may cause UE states to be installed on the second distributed unit 312*b* such that the second distributed unit 312*b* is prepared to carry on communications with the UE 304 and other UEs in communication with the first distributed unit 312*a* prior to initiating the handover. As shown in FIG. 4, prior to initiating the handover, the switch device 310 performs an act 404 of routing communications between the UE 304 and the first distributed unit 312*a*.

As further shown in FIG. 4, the centralized unit 318 may perform an act 406 of providing a handover command to the first distributed unit 312*a*. In one or more embodiments, the handover command is generated by the middlebox migration system 316. In one or more embodiments, the handover command is generated by other routines or applications on the centralized unit 318 (e.g., with the middlebox migration system 316 responding to the handover command). As shown in FIG. 4, upon receiving the handover command, the first distributed unit 312*a* performs an act 408 of providing the handover command or handover instructions to the UE 304. As further shown, the first distributed unit 312*a* performs an act 410 of providing an acknowledgement or other response to the centralized unit 318 to indicate that the handover command has been successfully received and/or provided to the UE 304. In this example, the middlebox migration system 316 detects that the handover has initiated by virtue of being on the centralized unit 318. It will be noted that each of acts 402-410 may be performed in a similar manner as corresponding acts discussed above.

As further shown in FIG. 4, upon initiating the handover (e.g., generating and sending the handover command), the components of the environment 300 may perform acts similar to the acts discussed above in connection with FIG. 2. For example, as shown in FIG. 4, the switch device(s) 310 and first distributed unit 312*a* may perform an act 412 of breaking a first connection with the first distributed unit 312*a*. Further, the centralized unit 318 may perform an act 414 of toggling network traffic from the first distributed unit 312*a* to the second distributed unit 312*b*. Based on the toggle instructions and breaking the first connection, the switch device 310 can perform an act 416 of routing network traffic between the UE 304 to the second distributed unit 312*b*. Once the handover is complete, the first distributed unit 312*a* may perform an act 418 of initiating or otherwise carrying out a planned update operation.

It will be noted that each of the above-illustrated examples show distributed units implemented on a single edge network. Notwithstanding these examples, in one or more embodiments, the distributed units may be implemented on different datacenters that are (at the time of handover) serviced by the same radio unit and by the same centralized unit.

In addition, it will be noted that the above implementations are described in connection with facilitating an inter-distributed unit handover with respect to network traffic from a single UE being handed over between a first distributed unit to a second distributed unit. In one or more embodiments, the inter-distributed unit handover may involve facilitating a handover between the distributed units for multiple UEs.

Figure 5:
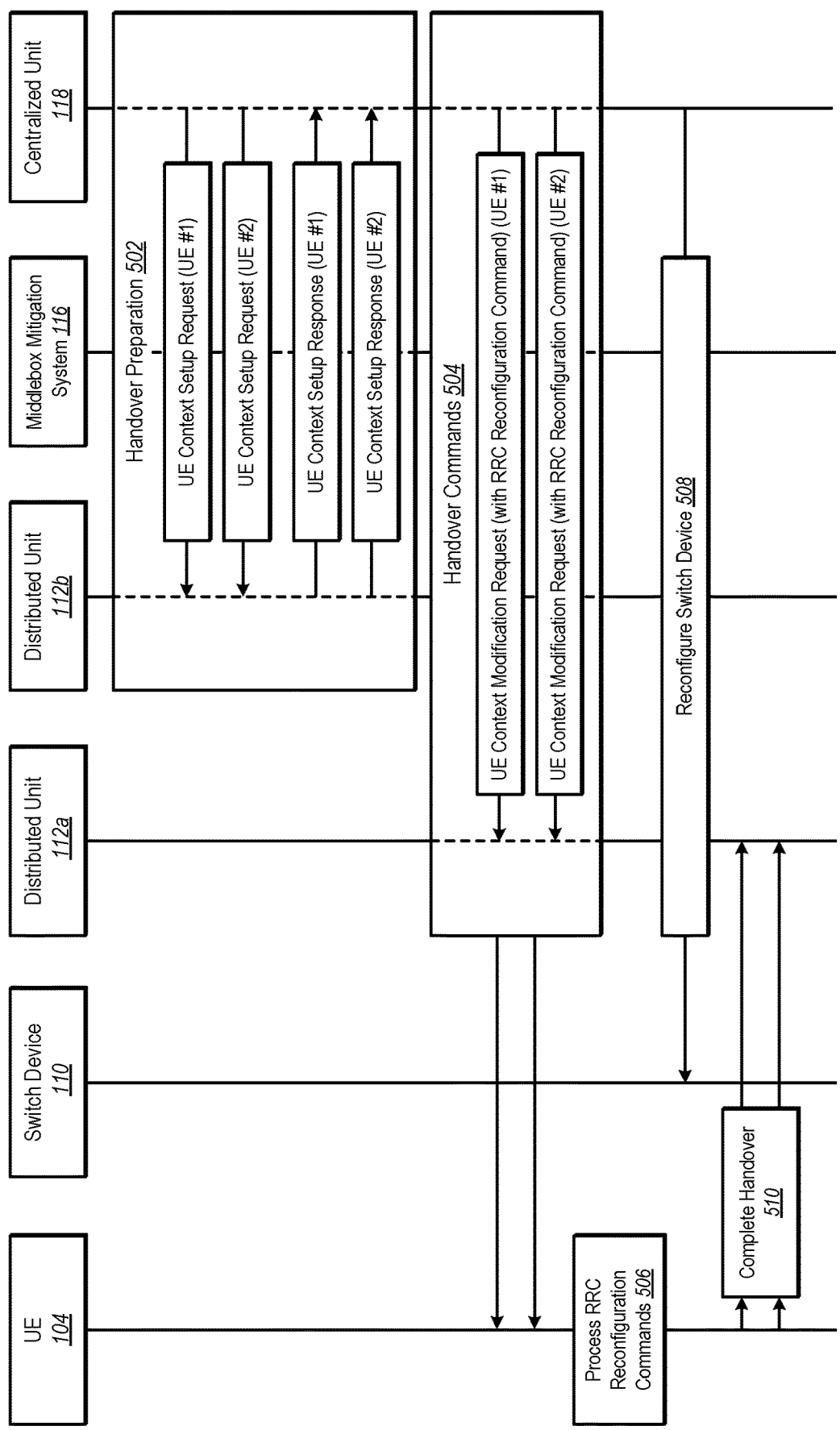
FIG. 5 illustrates an example implementation involving reconfiguring components of a vRAN environment in facilitating an inter-distributed unit handover in accordance with one or more embodiments.

An example will now be discussed in connection with performing an inter-distributed unit handover between first and second distributed units for multiple UEs including a first UE and a second UE. Other examples may include more than two UEs. This example is illustrated in FIG. 5. In this example, components may perform an act 502 of handover preparation. As shown in FIG. 5, a centralized unit 118 may provide a first UE context setup request to the second distributed unit 112*b* (the target distribute unit) associated with a first UE. The centralized unit 118 may also provide a second UE context setup request to the second distribute unit 112*b* associated with the second UE. The second distributed unit 112*b* may provide a first UE context setup response associated with the first UE to the centralized unit 118. The second distributed unit 112*b* may provide a second UE context setup response associated with the second UE to the centralized unit 118. These acts of communicating the UE context setup requests and responses may be acts performed as part of the acts 202, 402 of preparing for inter-distributed unit handover discussed above in connection with FIGS. 2 and 4.

As further shown in FIG. 5, components of the environment may perform an act 504 of delivering handover commands. In this example involving first and second UEs 104, the centralized unit 118 may provide a first UE context modification request including a radio resource control (RRC) reconfiguration command to the first distributed unit 112*a* (the original distributed unit). The centralized unit 118 may further provide a second UE context modification request including an RRC reconfiguration command to the first distributed unit 112*a*. These RRC reconfiguration commands may be acts performed as part of the acts 206, 406 of the centralized unit 118 providing a handover command to the first distributed unit discussed above in connection with FIGS. 2 and 4. Further in connection with this example involving the first and second UEs 104, the first distributed unit 112*a* may provide the RRC reconfiguration commands to the respective UEs 104, which may be acts performed as part of the acts 208, 408 of providing the handover commands to the UE described above in connection with FIGS. 2 and 4. In this example, providing the RRC reconfiguration commands to the UEs 104 may initiate the UEs 104 to stop communicating with the first distributed unit 112*a*.

As shown in FIG. 5, the UEs 104 may perform an act 506 of processing the RRC reconfiguration commands. Similar to one or more embodiments described above, after the RRC reconfiguration commands have been communicated, the centralized unit 118 may perform an act 508 of reconfiguring the switch device 110. Indeed, as shown in FIG. 5, the centralized unit 118 may initiate an act of reconfiguring the switch device 110 to steer network traffic received from the radio unit to the second distributed unit 112*b*, enabling the UEs 104 to re-attach to the second distributed unit 112*b*. As discussed above, this hard handover involves a handover between the first distributed unit 112*a* and second distributed unit 112*b* for traffic being communicated via the same radio unit both before and after performing the inter-distributed unit handover.

Further in connection with this example involving first and second UEs, the UEs 104 may perform an act 510 of providing an indication of a completed handover. In one example, the first UE provides an indication that the RRC reconfiguration is complete, marking an end of a hard handover between the first distributed unit 112*a* and the second distributed unit 112*b* for the first UE. Similarly, the second UE may provide an indication that the RRC reconfiguration is complete, marking an end of a hard handover between the first distributed unit 112*a* and the second distributed unit 112*b* for the second UE.

Figure 6:
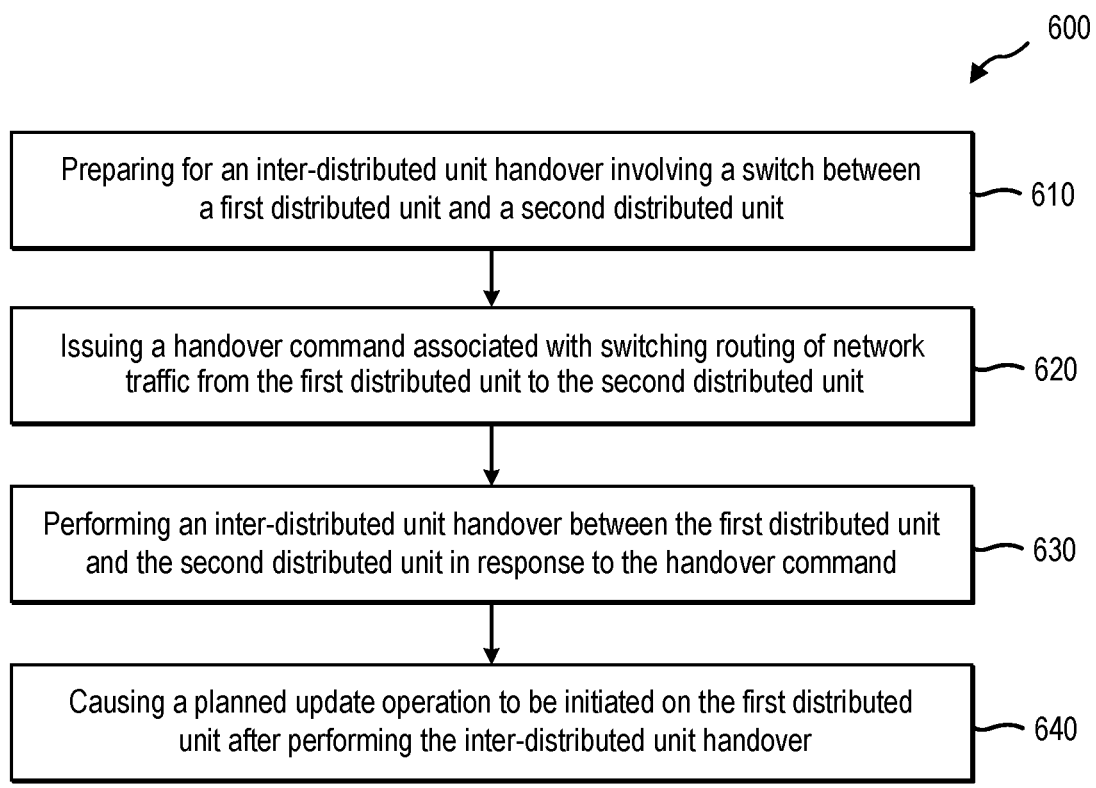
FIG. 6 illustrates an example series of acts for performing a distributed unit handover pursuant to initiating an upgrade on a distributed unit of a vRAN in accordance with one or more embodiments.

Turning now to FIG. 6, this figure illustrates an example flowchart including a series of acts for increasing resiliency in a vRAN in performing an inter-distributed unit handover in accordance with one or more embodiments described herein. While FIG. 6 illustrates acts according to one or more embodiments, alternative embodiments may omit, add to, reorder, and/or modify any of the acts shown in FIG. 6. The acts of FIG. 6 may be performed as part of a method. Alternatively, a non-transitory computer-readable medium can include instructions thereon that, when executed by one or more processors, cause a server device and/or client device to perform the acts of FIG. 6. In still further embodiments, a system can perform the acts of FIG. 6.

As noted above, FIG. 6 illustrates a series of acts 600 in which a middlebox migration system facilitates performing an inter-distributed unit handover between a first distributed unit and a second distributed unit in a vRAN environment. As shown in FIG. 6, the series of acts 600 includes an act 610 of preparing for an inter-distributed unit handover involving a switch between a first distributed unit and a second distributed unit. In one or more embodiments, the act 610 involves preparing for an inter-distributed unit handover involving a switch from communicating network traffic between a radio unit and a first distribute unit to communicating network traffic between the radio unit and a second distributed unit.

As further shown in FIG. 6, the series of acts 600 includes an act 620 of issuing a handover command associated with switching routing of network traffic from the first distributed unit to the second distributed unit. In one or more embodiments, the act 620 involves causing a handover command to be issued, the handover command being associated with switching routing of network communications using a first distributed unit to a second distributed unit.

As further shown in FIG. 6, the series of acts 600 includes an act 630 of performing an inter-distributed unit handover between the first distributed unit and the second distributed unit in response to the handover command. In one or more embodiments, the act 630 involves causing performance of the inter-distributed handover between the first distributed unit and the second distributed unit in response to the handover command. Performing the inter-distributed unit handover may include deactivating (e.g., breaking or otherwise stopping communications between the radio unit and distributed unit) a first connection between the radio unit and the first distributed unit. Performing the inter-distributed handover may further include activating, after deactivating the first connection, a second connection between the radio unit and the second distributed unit where activating the second connection includes causing fronthaul traffic to be routed to the second distributed unit.

As further shown, the series of acts 600 includes an act 640 of causing a planned update operation to be initiated on the first distributed unit after performing the inter-distributed unit handover. In one or more implementations, the act 640 involves causing a planned update operation to be initiated on the first distributed unit after performing the inter-distributed unit handover between the first distributed unit and the second distributed unit.

In one or more embodiments, preparing for the inter-distributed unit handover includes establishing, by a middlebox entity, a plurality of stream control transmission protocol (SCTP) connections between the centralized unit and the plurality of distributed units. In one or more embodiments, preparing for the inter-distributed unit handover includes installing, on the second distributed unit, a plurality of states of UEs of the first distributed unit prior to the handover command being issued. In one or more embodiments, preparing for the inter-distributed unit handover is performed in response to receiving a request to implement an upgrade on the first distributed unit. In one or more embodiments, preparing for the inter-distributed unit handover is performed by a middlebox entity on a server device, the middlebox entity including a network function implemented in the virtualized radio access network of a 5G telecommunications network.

In one or more embodiments, performing the inter-distributed unit handover includes receiving, from the first distributed unit, a confirmation that the handover command has been issued. In one or more embodiments, the second distributed unit is in an inactive state prior to the handover command being issued. In one or more embodiments, the second distributed unit is configured to act as a handover distributed unit for the first distributed unit and one or more additional distributed units from the plurality of distributed units.

In one or more embodiments, preparing for the inter-distributed unit handover is performed by a middlebox entity on a server device where the middlebox entity is implemented on a server device positioned between the plurality of distributed units and the centralized unit. In one or more embodiments, preparing for the inter-distributed unit handover is performed by a middlebox entity implemented on the centralized unit.

In one or more embodiments, prior to performing the inter-distributed unit handover, the first distributed unit receives traffic from a first radio unit, and wherein after performing the inter-distributed unit handover, the second distributed unit receives traffic from the first radio unit. In one or more embodiments, causing the fronthaul traffic to be routed to the second distributed unit includes configuring an Ethernet switch positioned between the plurality of distributed units and a radio unit to route network traffic to the second distributed unit. In one or more embodiments, the plurality of distributed units are implemented on respective server devices of an edge network of a cloud computing system.

Figure 7:
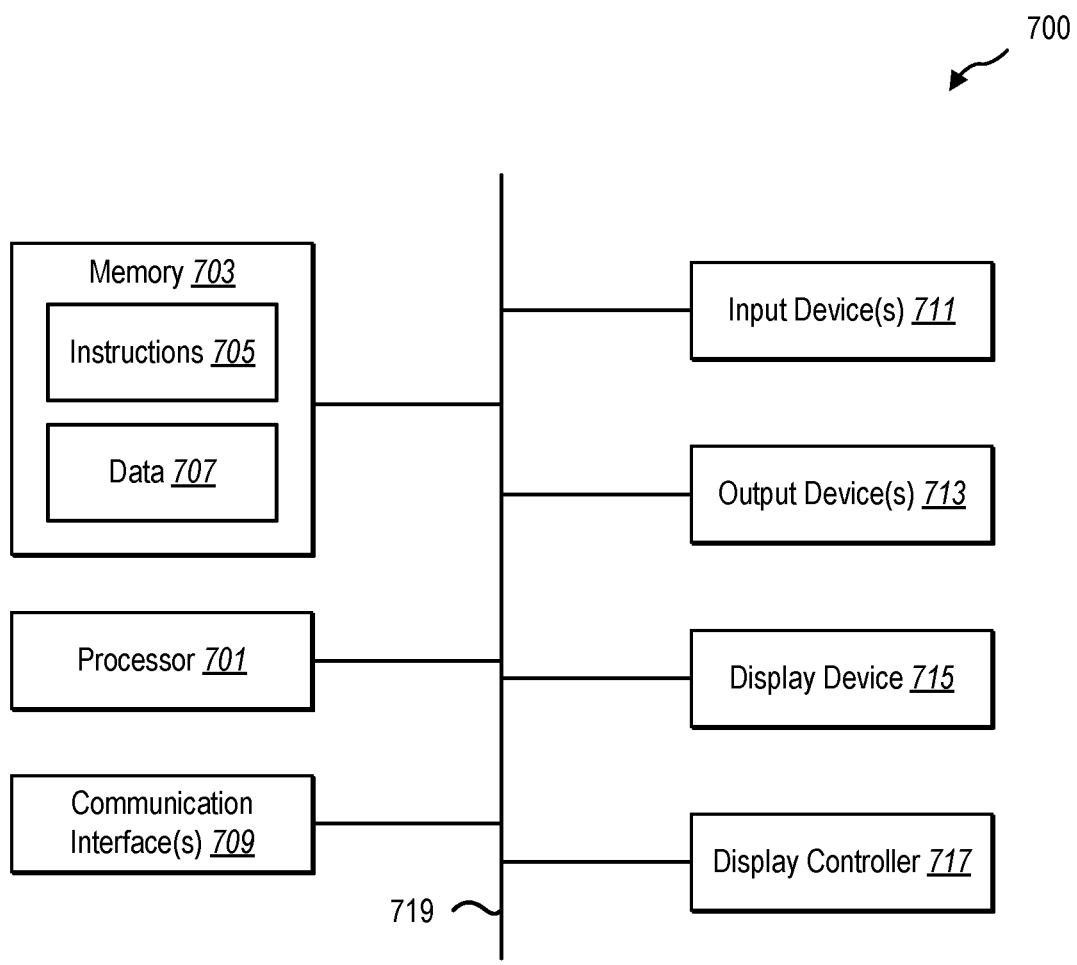
FIG. 7 illustrates certain components that may be included within a computer system.

FIG. 7 illustrates certain components that may be included within a computer system 700. One or more computer systems 700 may be used to implement the various devices, components, and systems described herein.

The computer system 700 includes a processor 701. The processor 701 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a telecommunications environment including a centralized unit and a plurality of distributed units in communication with a radio unit, a method for implementing a planned handover event in a virtual radio access network, the method comprising:
    preparing for an inter-distributed unit handover involving a switch from network traffic being communicated between a radio unit and a first distribute unit to network traffic being communicated between the radio unit and a second distributed unit;
    causing a handover command to be issued, the handover command being associated with switching routing of network traffic using a first distributed unit to a second distributed unit;
    causing, in response to the handover command, performance of the inter-distributed unit handover between the first distributed unit and the second distributed unit, wherein performing the inter-distributed unit handover includes:
        deactivating a first connection between the radio unit and the first distributed unit; and
        activating, after deactivating the first connection, a second connection between the radio unit and the second distributed unit, wherein activating the second connection includes causing fronthaul traffic to be routed to the second distributed unit; and
    causing a planned update operation to be initiated on the first distributed unit after performing the inter-distributed unit handover between the first distributed unit and the second distributed unit.

2. The method of claim 1, wherein preparing for the inter-distributed unit handover includes establishing, by a middlebox entity, a plurality of stream control transmission protocol (SCTP) connections between the centralized unit and the plurality of distributed units.

3. The method of claim 1, wherein preparing for the inter-distributed unit handover includes installing, on the second distributed unit, a plurality of states of user equipments (UEs) of the first distributed unit prior to the handover command being issued.

4. The method of claim 1, wherein preparing for the inter-distributed unit handover is performed in response to receiving a request to implement an upgrade on the first distributed unit.

5. The method of claim 1, wherein preparing for the inter-distributed unit handover is performed by a middlebox entity on a server device, the middlebox entity including a network function implemented in the virtualized radio access network of a 5G telecommunications network.

6. The method of claim 1, wherein performing the inter-distributed unit handover includes receiving, from the first distributed unit, a confirmation that the handover command has been issued.

7. The method of claim 1, wherein the second distributed unit is in an inactive state prior to the handover command being issued.

8. The method of claim 1, wherein the second distributed unit is configured to act as a handover distributed unit for the first distributed unit and one or more additional distributed units from the plurality of distributed units.

9. The method of claim 1, wherein preparing for the inter-distributed unit handover is performed by a middlebox entity on a server device, and wherein the middlebox entity is implemented on a server device positioned between the plurality of distributed units and the centralized unit.

10. The method of claim 1, wherein preparing for the inter-distributed unit handover is performed by a middlebox entity implemented on the centralized unit.

11. The method of claim 1, wherein, prior to performing the inter-distributed unit handover, the first distributed unit receives traffic from a first radio unit, and wherein after performing the inter-distributed unit handover, the second distributed unit receives traffic from the first radio unit.

12. The method of claim 1, wherein causing the fronthaul traffic to be routed to the second distributed unit includes configuring an Ethernet switch positioned between the plurality of distributed units and a radio unit to route network traffic to the second distributed unit.

13. The method of claim 1, wherein the plurality of distributed units are implemented on respective server devices of an edge network of a cloud computing system.

14. In a 5G telecommunications network including a centralized unit and a plurality of distributed units in communication with a radio unit, a method performed by the centralized unit for implementing a planned handover event in a virtual radio access network, the method comprising:
preparing for an inter-distributed unit handover involving a switch from network traffic being communicated between a radio unit and a first distribute unit to network traffic being communicated between the radio unit and a second distributed unit;
issuing a handover command, the handover command being associated with switching routing of network traffic using a first distributed unit to a second distributed unit;
causing performance of the inter-distributed unit handover between the first distributed unit and the second distributed unit, wherein performing the inter-distributed unit handover includes:
deactivating a first connection between the radio unit and the first distributed unit; and
activating, after deactivating the first connection, a second connection between the radio unit and the second distributed unit, wherein activating the second connection includes causing fronthaul traffic to be routed to the second distributed unit; and
causing a planned update operation to be initiated on the first distributed unit after performing the inter-distributed unit handover between the first distributed unit and the second distributed unit.

15. The method of claim 14,
wherein the plurality of distributed units are implemented on respective server devices of an edge network of a cloud computing system,
wherein, prior to performing the inter-distributed unit handover, the first distributed unit receives traffic from a first radio unit, and
wherein after performing the inter-distributed unit handover, the second distributed unit receives traffic from the first radio unit.

16. The method of claim 14, wherein preparing for the inter-distributed unit handover includes establishing a plurality of stream control transmission protocol (SCTP) connections between the centralized unit and the plurality of distributed units.

17. The method of claim 14, wherein preparing for the inter-distributed unit handover includes installing, on the second distributed unit, a plurality of states of user equipments (UEs) of the first distributed unit prior to the handover command being issued.

18. The method of claim 14, wherein causing the fronthaul traffic to be routed to the second distributed unit includes configuring an Ethernet switch positioned between the plurality of distributed units and a radio unit to route network traffic to the second distributed unit.

19. A system, comprising:
at least one processor;
memory in electronic communication with the at least one processor; and
instructions stored in the memory, the instructions being executable by the at least one processor to:
preparing for an inter-distributed unit handover involving a switch from network traffic being communicated between a radio unit and a first distribute unit to network traffic being communicated between the radio unit and a second distributed unit;
causing a handover command to be issued, the handover command being associated with switching routing of network traffic using a first distributed unit to a second distributed unit;
cause, in response to the handover command, performance of the inter-distributed unit handover between the first distributed unit and the second distributed unit, wherein performing the inter-distributed unit handover includes:
deactivating a first connection between the radio unit and the first distributed unit; and
activating, after deactivating the first connection, a second connection between the radio unit and the second distributed unit, wherein activating the second connection includes causing fronthaul traffic to be routed to the second distributed unit; and
cause a planned update operation to be initiated on the first distributed unit after performing the inter-distributed unit handover between the first distributed unit and the second distributed unit.

20. The system of claim 19, wherein preparing for the inter-distributed unit handover is performed by a middlebox entity on a server device, wherein the middlebox entity is a network function implemented in the virtualized radio access network of a 5G telecommunications network, and wherein distributed units of the plurality of distributed units are implemented on respective server devices of an edge network of a cloud computing system.

* * * * *